(12) United States Patent
Ikuta et al.

(10) Patent No.: US 9,302,363 B2
(45) Date of Patent: Apr. 5, 2016

(54) DUST COLLECTING DEVICE AND IMPACT TOOL

(75) Inventors: Hiroki Ikuta, Anjo (JP); Ken Yamauchi, Anjo (JP); Takamasa Hanai, Anjo (JP); Masao Miwa, Anjo (JP); Tomohiro Ukai, Anjo (JP); Shusaku Wakatsuki, Anjo (JP); Akihiro Ito, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 650 days.

(21) Appl. No.: 13/807,884

(22) PCT Filed: Jul. 4, 2011

(86) PCT No.: PCT/JP2011/065310
§ 371 (c)(1),
(2), (4) Date: Mar. 15, 2013

(87) PCT Pub. No.: WO2012/005225
PCT Pub. Date: Jan. 12, 2012

(65) Prior Publication Data
US 2013/0213681 A1     Aug. 22, 2013

(30) Foreign Application Priority Data

Jul. 8, 2010  (JP) ................................. 2010-156045

(51) Int. Cl.
*B23Q 41/00*  (2006.01)
*B23B 47/34*  (2006.01)
(Continued)

(52) U.S. Cl.
CPC ................ *B23Q 41/00* (2013.01); *B23B 47/34* (2013.01); *B23Q 11/0046* (2013.01); *B23Q 11/0071* (2013.01); *B25D 17/04* (2013.01); *B23B 2270/30* (2013.01); *Y02P 70/171* (2015.11)

(58) Field of Classification Search
CPC .... B23B 47/00; B23B 47/34; B23B 2270/30; B23Q 11/006; B23Q 11/0071; B23Q 11/0046; B23Q 11/042
USPC .................... 173/198, 217, 171; 408/67, 110; 175/209, 211; 15/339, 344, 414
See application file for complete search history.

(56) References Cited

U.S. PATENT DOCUMENTS

| | | | |
|---|---|---|---|
| 1,223,027 A | * 4/1917 | Brackett | ............... E21B 21/015 173/36 |
| 2,041,689 A | 5/1936 | Baumeister et al. | |

(Continued)

FOREIGN PATENT DOCUMENTS

| | | |
|---|---|---|
| DE | 9218375 U1 | 1/1994 |
| GB | 2 347 101 A | 8/2000 |

(Continued)

OTHER PUBLICATIONS

Chinese Office Action issued in Chinese Patent Application No. 201180033208.8 on Jun. 26, 2014 (with translation).

(Continued)

*Primary Examiner* — Scott A. Smith
(74) *Attorney, Agent, or Firm* — Oliff PLC

(57) ABSTRACT

Disclosed is a feature that collects dust particles that arise from a processing operation of an impact tool. The dust collection device collects dust that arises from of a processing operation and is attached to the impact tool that performs a pre-determined processing operation on a processed member by way of a tool bit mounted to the tip region of the tool body being linearly operated at least in the lengthwise direction. The dust collection device has a dust collection unit of which the tip opens as a dust intake port and the contour shape is formed unevenly around the long axis of the tool bit. The position of the dust collection unit is freely selected around the long axis of the tool bit, and it is possible to cause the position to change around the long axis of the bit.

7 Claims, 8 Drawing Sheets

(51) Int. Cl.
*B23Q 11/00* (2006.01)
*B25D 17/04* (2006.01)

(56) References Cited

U.S. PATENT DOCUMENTS

| | | | | |
|---|---|---|---|---|
| 2,990,024 | A * | 6/1961 | Van Allsburg | B23Q 11/0046 175/211 |
| 4,064,952 | A * | 12/1977 | Lechner | B23Q 11/006 137/43 |
| 4,097,176 | A * | 6/1978 | Wanner | B23Q 1/0036 175/213 |
| 4,205,728 | A * | 6/1980 | Gloor | B23Q 11/0046 175/209 |
| 4,207,953 | A | 6/1980 | Reibetanz et al. | |
| 5,090,499 | A * | 2/1992 | Cuneo | B23Q 11/0046 173/75 |
| 5,113,951 | A * | 5/1992 | Houben | B25D 11/005 173/75 |
| 5,988,954 | A * | 11/1999 | Gaskin | B23Q 11/0046 408/67 |
| 6,053,674 | A * | 4/2000 | Thompson | B23Q 11/0046 175/209 |
| 6,379,091 | B1 * | 4/2002 | Queipo | B23Q 11/0046 408/67 |
| 6,887,146 | B2 * | 5/2005 | Staas | B23Q 11/0046 144/252.1 |
| 6,951,439 | B2 * | 10/2005 | Arich | B23Q 11/0046 15/414 |
| 7,740,086 | B2 * | 6/2010 | Bleicher | B25D 17/20 173/198 |
| 7,794,184 | B2 * | 9/2010 | Di Nicolantonio | B23B 47/00 408/110 |
| 8,052,357 | B2 * | 11/2011 | Bruntner | B23B 47/00 408/67 |
| 8,113,747 | B2 * | 2/2012 | Miyanaga | B23B 49/02 408/67 |
| 2007/0261195 | A1 * | 11/2007 | Bleicher | B23Q 11/0046 15/344 |
| 2009/0317200 | A1 * | 12/2009 | Bruntner | B23B 47/00 408/67 |

FOREIGN PATENT DOCUMENTS

| | | |
|---|---|---|
| JP | U-54-144485 | 10/1979 |
| JP | U-63-47812 | 3/1988 |
| JP | U-3-124805 | 12/1991 |
| JP | A-2007-303271 | 11/2007 |
| NL | 1017599 C2 | 9/2002 |

OTHER PUBLICATIONS

Feb. 28, 2015 Office Action issued in Chinese Patent Application No. 201180033208.8.

Jan. 9, 2015 Office Action issued in Japanese Patent Application No. 2010-156045.

Sep. 27, 2011 International Search Report issued in International Patent Application No. PCT/JP2011/065310 (with English-language translation).

Feb. 12, 2013 International Report on Patentability issued in International Patent Application No. PCT/JP2011/065310 (with translation).

Jan. 27, 2016 Search Report issued in European Patent Application No. 11803559.1.

* cited by examiner

DUST COLLECTING DEVICE AND IMPACT TOOL

FIELD OF THE INVENTION

The invention relates to a dust collecting device for collecting dust generated by an impact tool, and an impact tool having the dust collecting device.

BACKGROUND OF THE INVENTION

In an impact tool which performs a hammering operation or a hammer drill operation by a tool bit on a workpiece such as concrete, dust is generated during operation. Therefore, some conventional impact tools are provided with a dust collecting device for collecting dust generated during operation. For example, Japanese non-examined laid-open Patent Publication No. 2007-303271 discloses a dust collecting device having a cylindrical hood which is arranged to surround a tool bit. In this dust collecting device, dust generated by operation is sucked up through a front end opening of the hood and collected via a dust collecting hose.

When an operation is performed by the impact tool, a user visually checks the position of a front end of the tool bit all the time during operation. The hood of the dust collecting device attached to the impact tool may reduce visibility of the tool bit and the dust collecting hose for transferring dust may interfere with the operation.

DISCLOSURE OF THE INVENTION

Problems to be Solved by the Invention

It is, accordingly, an object of the present invention to provide a technique for enhancing visibility of a tool bit or a work area of a workpiece, in a dust collecting device for collecting dust generated by an impact tool.

Means for Solving the Problem

In order to solve the above-described problem, in a preferred embodiment according to the present invention, a dust collecting device is provided which is attached to an impact tool and collects dust generated by the impact tool. In the impact tool, a tool bit coupled to a front end region of a tool body is caused to rectilinearly move in an axial direction of the tool bit. The dust collecting device includes a dust collecting part having a dust suction port at its front end and having a non-uniform contour shape around an axis of the tool bit. The "non-uniform contour shape around an axis of the tool bit" in this invention refers to a contour shape of a wall for forming the dust suction port which excludes a circular shape having its center on the axis of the tool bit.

According to this invention, by provision of the dust collecting part having a non-uniform contour shape around an axis of the tool bit, a region in which the tool bit is exposed and readily visible when a bit tip position or a work area of a workpiece is viewed over the dust collecting part can be provided in a circumferential region of the dust collecting part.

According to a further embodiment of this invention, the dust collecting part is mounted onto the tool bit and can be changed in position around the axis of the tool bit. According to this invention, with such a construction, the position of the dust collecting part can be adjusted to the user's position (line of sight) such that the readily visible region of the dust collecting part is positioned in the line of sight when the bit tip or the work area of the workpiece is viewed over the dust collecting part during operation. Thus, the visibility can be secured during operation.

According to a further embodiment of this invention, the dust collecting device further includes a dust collecting hose which is connected to the dust collecting part and through which dust is transferred downstream, and a hose holding part for holding the dust collecting hose. The hose holding part is mounted to the tool body such that it can be rotated around the axis of the tool bit with respect to the tool body. The position of the dust collecting part is changed around the axis of the tool bit when the dust collecting hose held by the hose holding part is rotated around the axis of the tool bit together with the hose holding part.

According to this invention, with the construction in which the positions of the dust collecting hose held by the hose holding part and the dust collecting part connected to the dust collecting hose can be changed around the axis of the tool bit by rotating the hose holding part around the axis of the tool bit, the dust collecting hose can be moved to a position in which it can be avoided from interfering with the operation while enhancing visibility when the bit tip or the work area of the workpiece is viewed over the dust collecting part. As a result, workability can be improved.

According to a further embodiment of this invention, the dust collecting device has a rotating member which is mounted onto the tool body and can be rotated around the axis of the tool bit with respect to the tool body. Further, the hose holding part is mounted to the rotating member such that it can be rotated around an axis transverse to the axial direction of the tool bit with respect to the rotating member.

According to this invention, the direction of the dust collecting hose can be arbitrarily changed, for example, to a parallel or transverse direction, with respect to the axial direction of the tool bit by rotating the hose holding part around an axis transverse to the axial direction of the tool bit. Thus, the operation can be performed with the dust collecting hose kept out of the way of the operation, so that the workability is further improved.

According to a further embodiment of this invention, the dust collecting device further includes a dust collecting hose which is connected to the dust collecting part and through which dust is transferred downstream, and a hose holding part for holding the dust collecting hose. The hose holding part is mounted to an auxiliary handle which is mounted on the tool body at a mounting position which can be changed around the axis of the tool bit. Further, when the mounting position of the auxiliary handle is changed with respect to the tool body, the positions of the dust collecting hose held by the hose holding part and the dust collecting part are changed around the axis of the tool bit together with the auxiliary handle.

According to this invention, when the position of the auxiliary handle is changed around the axis of the tool bit, the positions of the dust collecting hose and the dust collecting part are changed around the axis of the tool bit together with the auxiliary handle. With this construction, the position change of the dust collecting hose and the dust collecting part can be made at the same time as the position change of the auxiliary handle. Thus, an efficient and rational position changing operation can be realized.

According to a further embodiment of this invention, the dust collecting device further includes a dust collecting hose which is connected to the dust collecting part and through which dust is transferred downstream. Further, a front end region of the dust collecting part is inclined such that it extends away from the bit tip on its one side having a connecting part connected with the dust collecting hose, while extending toward the bit tip on the opposite side from the connecting part side with respect to the tool bit.

According to this invention, by provision of the construction in which the front end region of the dust collecting part is inclined such that it extends away from the bit tip on the connecting part side for connection with the dust collecting hose, a region of the dust collecting part on the connecting part side for connection with the dust collecting hose is designed as a region in which the bit tip is exposed and readily visible when a bit tip position or a work area of a workpiece is viewed over the dust collecting part. Thus, the visibility can be secured.

According to a further embodiment of this invention, the dust collecting device further includes a dust collecting hose which is connected to the dust collecting part and through which dust is transferred downstream. Further, a passage from the dust suction port to the dust collecting hose is partitioned into several parts by a partition, and the flow passage sectional area of each part of the partitioned passage is smaller than a minimum flow passage sectional area of the dust collecting hose.

According to this invention, as for dust which is sucked up through the dust collecting part and led through the dust collecting hose, a large piece of dust (chip) which has a size larger than the minimum flow passage sectional area of the dust collecting hose can be blocked by the partition, so that clogging of the dust collecting part can be prevented.

According to a further embodiment of this invention, the impact tool having the dust collecting device as defined in any one of claims 1 to 6 is provided. Thus, the impact tool can be provided with the dust collecting device which can secure visibility during operation.

Effect of the Invention

According to this invention, in a dust collecting device for collecting dust generated by an impact tool, visibility of a bit tip or a work area of a workpiece can be enhanced.

Other objects, features and advantages of the present invention will be readily understood after reading the following detailed description together with the accompanying drawings and the claims.

REPRESENTATIVE EMBODIMENT OF THE INVENTION

Each of the additional features and method steps disclosed above and below may be utilized separately or in conjunction with other features and method steps to manufacture and use improved dust collecting devices and impact tools and methods for using them and devices utilized therein. Representative examples of the present invention, which examples utilized many of these additional features and method steps in conjunction, is now described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

First Embodiment of the Invention

Figure 1:
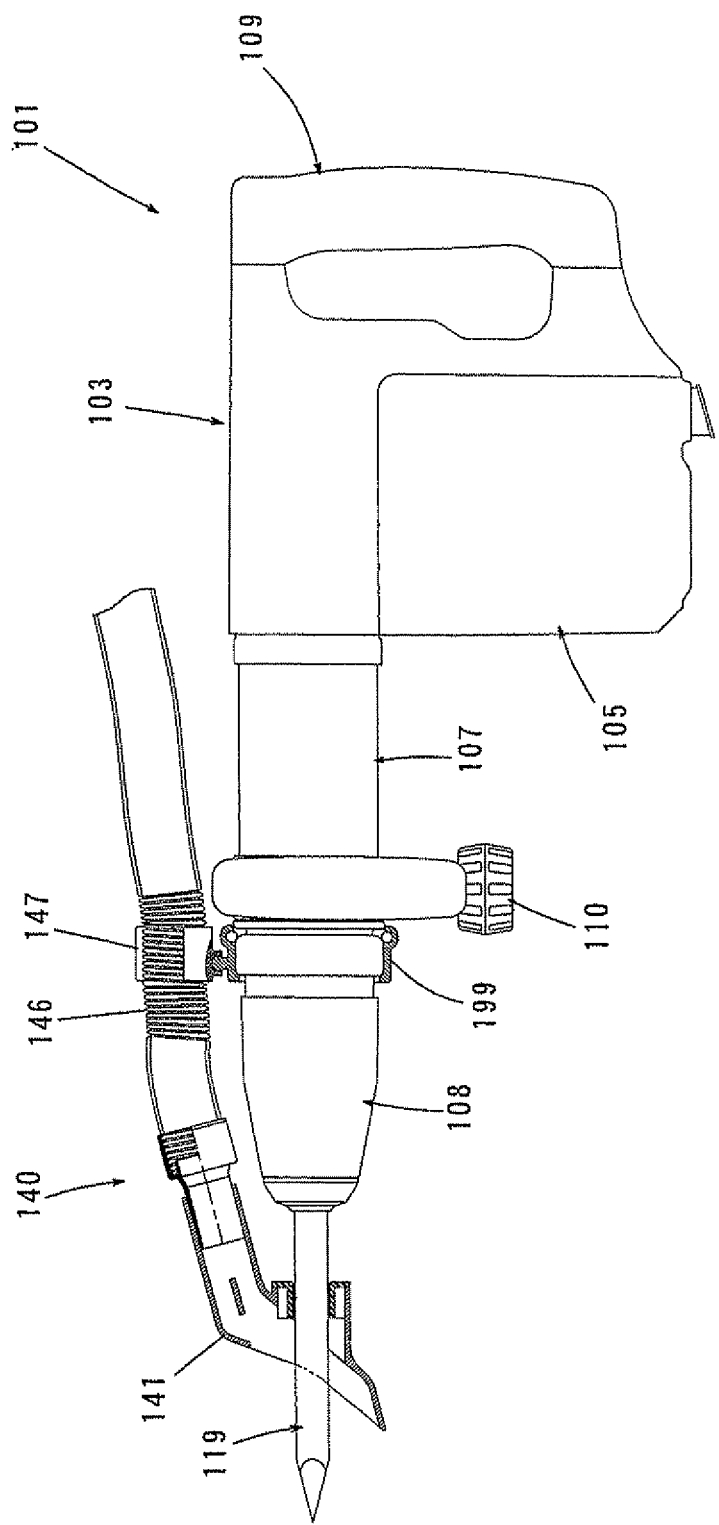
FIG. 1 is an external view showing an entire electric hammer with a dust collecting device according to a first embodiment of the present invention.

A dust collecting device according to a first embodiment of the present invention is now described with reference to FIGS. 1 to 6. This embodiment is explained as being applied to an electric hammer as a representative example of an impact tool. FIG. 1 shows an entire electric hammer with a dust collecting device 140 attached thereto. The construction of the electric hammer 101 to which the dust collecting device 140 can be attached is now briefly explained with reference to FIG. 1. The hammer 101 mainly includes a body 103 that forms an outer shell of the hammer 101, an elongate hammer bit 119 detachably coupled to the front end region (on the left side as viewed in FIG. 1) of the body 103 via a tool holder (not shown), and a main handle in the form of a handgrip 109 connected to the body 103 on the side opposite to the hammer bit 119 and designed to be held by a user. The body 103 and the hammer bit 119 are features that correspond to the "tool body" and the "tool bit", respectively, according to the present invention. The hammer bit 119 is held by the tool holder via a chuck 108 such that it is allowed to reciprocate with respect to the tool holder in its axial direction and prevented from rotating with respect to the tool holder in its circumferential direction. For the sake of convenience of explanation, in the hammer 101, the side of the hammer bit 119 is taken as the front and the side of the main handle 109 as the rear.

The body 103 mainly includes a housing 105 and a generally cylindrical barrel 107 connected to the front of the housing 105. The body 103 houses a driving motor, a motion converting mechanism in the form of a crank mechanism which converts rotation of the driving motor into linear motion, and a striking mechanism which is driven by the crank mechanism and includes a striker (striking element) for striking the hammer bit 119 in the axial direction and an impact bolt (intermediate element) for transmitting the striking movement of the striker to the hammer bit 119. Further, an auxiliary handle in the form of a side handle 110 is detachably mounted onto the barrel 107 of the body 103.

In the hammer 101 constructed as described above, when the driving motor is driven, a striking force is applied to the hammer bit 119 in the axial direction from the crank mechanism via the striking mechanism. Thus, the hammer bit 119 performs an operation (chipping operation) on a workpiece (concrete) by a hammering movement in the axial direction.

The dust collecting device 140 is now explained with reference to FIGS. 1 to 6. The dust collecting device 140 is attached to the hammer 101 and serves to suck up dust generated during operation on a workpiece. The dust collecting device 140 according to this embodiment mainly includes a resin or rubber dust collecting hood 141 for collecting dust, a dust collecting hose 146 for transferring dust downstream from the dust collecting hood 141, a hose holder 147 for holding the dust collecting hose 146, and a mounting ring 199 for mounting the hose holder 147 to the barrel 107. The dust collecting hood 141, the dust collecting hose 146 and the hose holder 147 are features that correspond to the "dust collecting part", the "dust transfer part" and the "hose holding part", respectively, according to the present invention.

Figure 2:
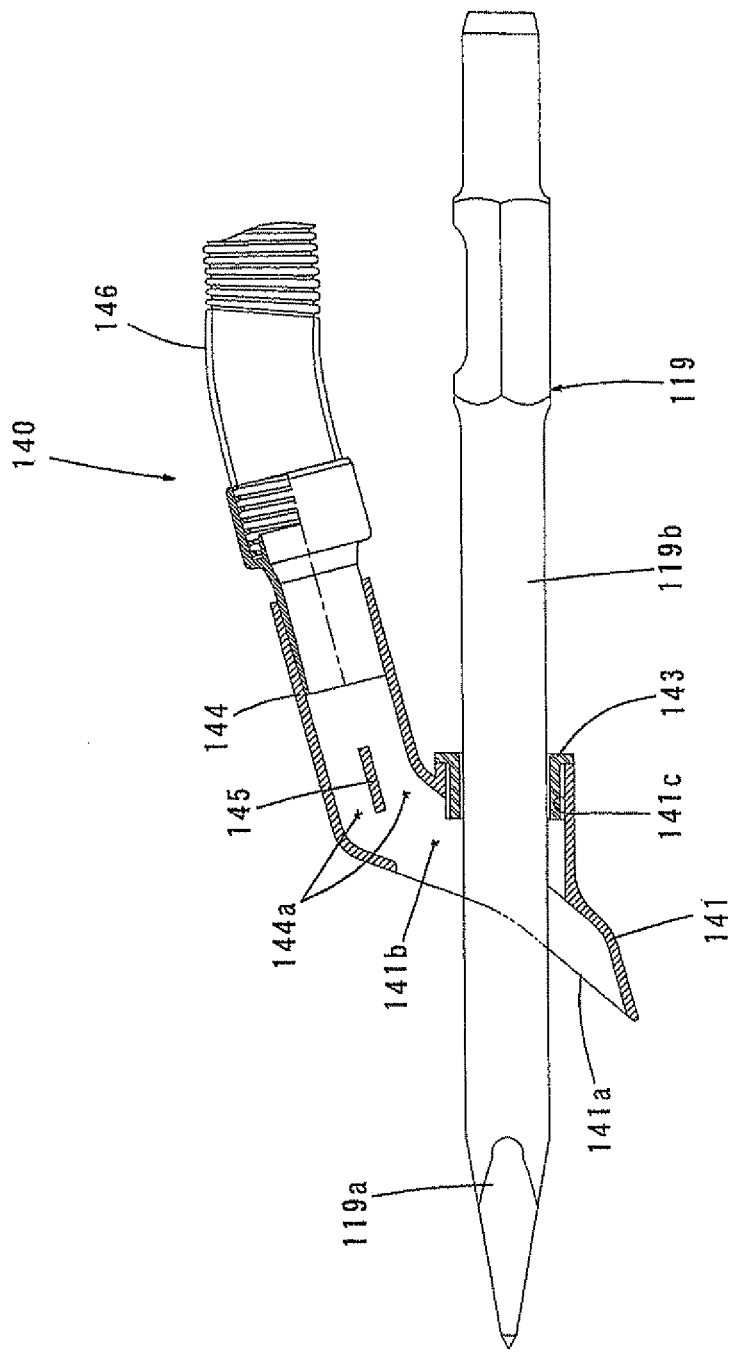
FIG. 2 is a sectional view showing the entire structure of the dust collecting device.
Figure 3:
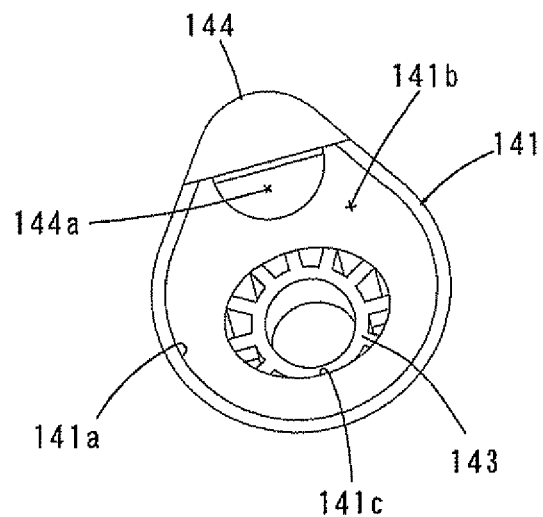
FIG. 3 is a front view showing the configuration of a front end of a dust collecting hood.

As shown in FIGS. 2 and 3, the dust collecting hood 141 is a generally cup-like member (generally cylindrical member with a bottom) which is arranged to surround the hammer bit 119 entirely around its axis with a predetermined clearance in the radial direction and has an internal space 141b with an open front end formed as a dust suction port 141a. On its bottom (on the side opposite from the dust suction port 141a), the dust collecting hood 141 has a through hole 141c extending in the axial direction of the hammer bit and formed for mounting a cylindrical sliding member 143 therein, and a hose connecting part 144 formed adjacent to the through hole 141c.

The cylindrical sliding member 143 is a guiding member for the dust collecting hood 141 and has a bore which is slidably fitted onto a shank 119b of the hammer bit 119. The cylindrical sliding member 143 is detachably fitted in the through hole 141c of the dust collecting hood 141. The dust suction port 141a of the dust collecting hood 141 is disposed at a predetermined distance away from a bit tip 119a of the hammer bit 119 by fitting the cylindrical sliding member 143 onto the hammer bit 119 from the front. The bore inner wall surface of the cylindrical sliding member 143 is slidably engaged with the outer surface of the shank of the hammer bit 119. Thus, the dust collecting hood 141 is held on the shank 119b of the hammer bit 119, while being allowed to move in the axial direction with respect to the hammer bit 119 via the cylindrical sliding member 143.

The hose connecting part 144 has an open front end formed as a dust inlet into the internal space 141b of the dust collecting hood 141. As shown in FIG. 1, the hose connecting part 144 extends rearward to a predetermined length along the outer contour (tapered cylindrical shape) of the chuck 108. The hose connecting part 144 has an open rear end formed as a dust outlet, and the dust collecting hose 146 is detachably inserted in and connected to the dust outlet. Further, a partition 145 is formed in a front end region of the hose connecting part 144 and serves to partition a passage of the hose connecting part 144 into several parts. The hose connecting part 144 is partitioned into passages 144a by the partition 145 such that the flow passage sectional area of each passage 144a is smaller than the minimum flow passage sectional area of the dust collecting hose 146. With this construction, a large piece of dust (chip) is blocked by the partition 145 and prevented from entering the dust collecting hose 146, so that clogging of the hose can be avoided.

As shown in FIG. 3, the dust collecting hood 141 has a generally elliptical shape in front view (when viewed from the bit tip of the hammer bit 119). Further, as shown in FIG. 2, the front end region (the dust suction port 141a side) of the dust collecting hood 141 includes a region on a connecting part side for connection with the dust collecting hose 146 and a region on the opposite side from the connecting part side with respect to the hammer bit 119. The front end region of the dust collecting hood 141 is inclined such that it extends away from the bit tip 119a of the hammer bit 119 on the hose connecting part 144 side, while extending toward the bit tip on the opposite side. Specifically, the front end region of the dust collecting hood 141 has a circumferential shape inclined with respect to the axial direction of the hammer bit 119 such that the region on the hose connecting part 144 side extends away from the bit tip 119a. With this configuration, when the bit tip 119a (a work area of the workpiece) is viewed over the hose connecting part 144 (from the hose connecting part 144 side), the hammer bit 119 has a wider exposed region, so that visibility of the bit tip 119a can be improved and dust sucked up into the dust collecting hood 141 can be smoothly led into the hose connecting part 144. The above-described inclined configuration is a feature that corresponds to "non-uniform shape around the axis of the tool bit" according to this invention. In this embodiment, by provision of the dust collecting hood 141 having the front end region inclined with respect to the axial direction of the hammer bit 119, a part of a circumferential region of the dust collecting hood 141 which includes the hose connecting part 144 is designed as a region over which the bit tip 119a (a work area of the workpiece) is readily visible.

The dust collecting hose 146 is a tubular member made of rubber or resin and having a bellows-like part 146a formed at least in part. The dust collecting hose 146 is connected to the dust collecting hood 141 by inserting one (front) end of the dust collecting hose 146 into the dust outlet of the hose connecting part 144. The dust collecting hose 146 extends along the body 103 of the hammer 101 generally in the axial direction of the hammer bit 119 and is held on the barrel 107 (via a mounting ring 199 which is described below) by the hose holder 147. Further, the dust collecting hose 146 is connected to a dust collector (not shown) at least during operation. In this manner, the dust collecting device 140 of this embodiment is constructed to be held on the hammer 101 at two points in the longitudinal direction such that the dust collecting hose 146 is held on the body 103 and the dust collecting hood 141 is held on the hammer bit 119. Further, in this embodiment, the dust collecting hose 146 is connected to a dust collector formed separately from the hammer 101, but it may be connected otherwise. For example, provided that the hammer 101 has a suction device including a motor and a motor-driven dust collecting fan, or that the dust collecting device itself has a suction device including a motor and a motor-driven dust collecting fan, the dust collecting hose 146 may be connected to the suction device.

Figure 4:
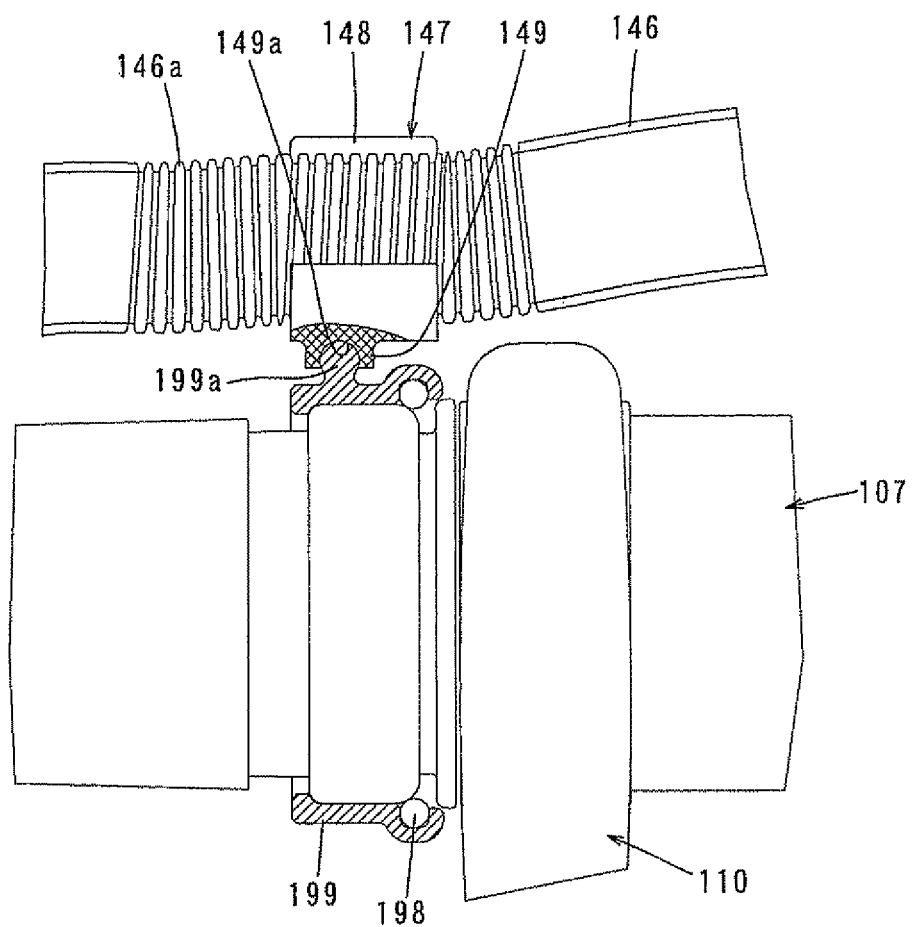
FIG. 4 is a partially sectional view showing a hose holder mounted to a body of the electric hammer via a mounting ring.
Figure 5:
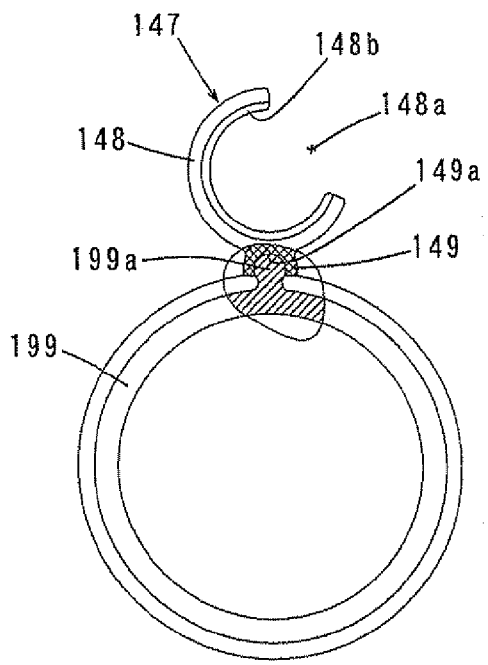
FIG. 5 is a front view, partly in section, showing a structure of mounting a hose holding part to the mounting ring.
Figure 6:
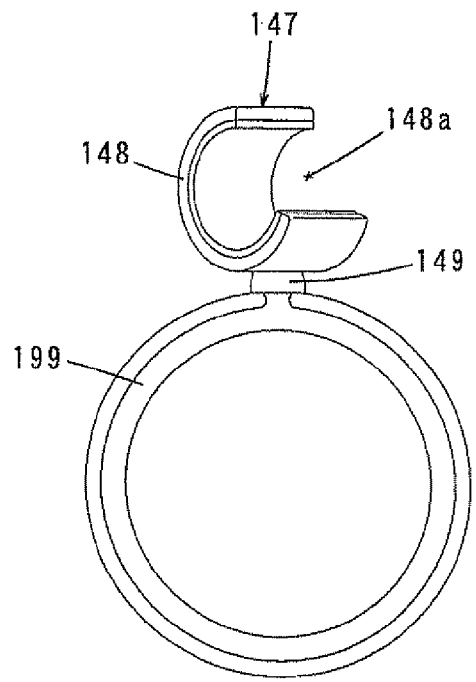
FIG. 6 is a front view showing the hose holding part rotated with respect to the mounting ring.

As shown in FIGS. 4 to 6, the hose holder 147 has a hose holder body 148 for holding the dust collecting hose 146 and a mounting base 149 integrally formed on the outer surface of the hose holder body 148 and protruding therefrom. The hose holder body 148 is a generally circular ring-like member having a hose attachment/removal opening 148a. A plurality of circumferentially extending rib-like projections 148b are formed on an inner circumferential surface of the hose holder body 148 and can engage with valleys of the bellows-like part 146a of the dust collecting hose 146. The opening width of the hose attachment/removal opening 148a in the circumferential direction is slightly smaller than the hose diameter. Therefore, in order to attach and remove the hose with respect to the hose holder body 148 through the hose attachment/removal opening 148a, the bellows-like part 146a is deformed into a generally elliptical form. The dust collecting hose 146 held by the hose holder body 148 is locked against axial movement by engagement between the projections 148a and the valleys of the bellows-like part 146a.

The hose holder 147 is mounted to the barrel 107 via the mounting ring 199. The mounting ring 199 is mounted onto the outer surface of the barrel 107 via an O-ring 198 such that it can rotate around the axis of the hammer bit 119. Therefore, the hose holder 147 mounted on the mounting ring 199 can be rotated around the axis of the hammer bit 119 together with the mounting ring 199. With this construction, the positions of the dust collecting hose 146 held by the hose holder 147 and the dust collecting hood 141 connected to the dust collecting hose 146 can be changed around the axis of the hammer bit 119. The mounting ring 199 is a feature that corresponds to the "rotating member" according to this invention.

Further, the mounting ring 199 has a spherical portion 199a formed on part of its outer circumferential surface and protruding in a direction transverse to the axial direction of the hammer bit 119. A spherical recessed surface 149a formed on the mounting base 149 of the hose holder 147 is engaged with the spherical portion 199a. With such a construction, the hose holder 147 can be turned around a center of the spherical portion 199a in all directions. Therefore, as shown in FIG. 6, the longitudinal direction of the dust collecting hose 146 can be changed by turning the hose holder 147 around an axis transverse to the axial direction of the hammer bit 119 with respect to the mounting ring 199.

The dust collecting device 140 according to this embodiment is constructed as described above. When a dust collector is driven and the hammer 101 is driven to perform a chipping operation on a workpiece by linear hammering movement of the hammer bit 119, the dust collecting device 140 can collect dust generated during the operation. Specifically, dust generated by the hammer 101 is sucked up into the dust collecting hood 141 through the dust suction port 141a and collected in the dust collector via the hose connecting part 144 of the dust collecting hood 141 and the dust collecting hose 146.

In this embodiment, the front end region of the dust collecting hood 141 has an inclined configuration cut diagonally in the axial direction of the hammer bit 119 and thus has a non-uniform configuration around the axis of the hammer bit 119. By provision of this configuration, a part of the circumferential region of the dust collecting hood 141 which includes the hose connecting part 144 is designed as a region over which the bit tip 119a (a work area of the workpiece) is readily visible. Therefore, a user can clearly recognize the status of the operation being performed by the hammer bit 119 by visually checking the bit tip 119a or the work area of the workpiece over the hose connecting part 144. Specifically, according to this embodiment, the visibility of the bit tip 119a or a work area of the workpiece can be secured during chipping operation.

As shown in FIG. 1, when a chipping operation is performed, for example, on a vertical wall, part of the circumferential region of the dust collecting hood 141 which includes the hose connecting part 144 is set to be positioned in the line of sight, or between a user's eye and a work area of the workpiece during operation, so that the visibility of the work area of the workpiece can be improved when the work area of the workpiece is viewed over the dust collecting hood 141. Further, part of the circumferential region of the dust collecting hood 141 which extends toward the bit tip 119a is placed below the hammer bit 119. With this construction, the dust suction port 141a can more easily catch chips which are scattered during chipping operation.

According to this embodiment, the hose holder 147 can be rotated around the axis of the barrel 107 (around the axis of the hammer bit 119) together with the mounting ring 199. Therefore, by rotating the hose holder 147 around the barrel 107 together with the mounting ring 199, the positions of the dust collecting hose 146 held by the hose holder 147 and the dust collecting hood 141 connected to the dust collecting hose 146 can be adjusted to the user's position. Thus, the dust collecting hose 146 can be moved to a position in which it can be avoided from interfering with the operation while securing visibility of the bit tip or a work area of the workpiece.

According to this embodiment, the hose holder 147 is connected to the mounting ring 199 via a spherical joint including the spherical portion 199a and the spherical recessed surface 149a. With this construction, as shown in FIGS. 5 and 6, the direction of the dust collecting hose 146 (not shown in FIGS. 5 and 6) can be arbitrarily changed, for example, to a parallel or transverse direction, with respect to the axial direction of the hammer bit 119 by appropriately turning the hose holder 147. Thus, in chipping operation, the dust collecting hose 146 can be moved to a position in which it can be avoided from interfering with the operation.

In chipping operation, hammer bits 119 of different lengths are used according to the operation conditions. In consideration of this, in this embodiment, the position of the front end of the dust collecting hood 141 (the position of the dust suction port 141a) can be adjusted with respect to the hammer bit 119 by changing the position in which the hose holder 147 holds the dust collecting hose 146. Thus, the dust suction port 141a can be positioned at an adequate distance from the bit tip of the hammer bit 119 to be used. As a result, such a problem that the dust collecting efficiency is reduced by increase of the distance between the dust suction port 141a and a dust generation area can be eliminated. According to this embodiment, the hammer bits 119 having different lengths can be accommodated without reducing the dust collecting ability, and a plurality of dust collecting hoods 141 are not needed.

Further, the hammer bits 119 are available in several types varying in length and in several types varying in the diameter of the shanks 119b. In consideration of this, in this embodiment, the cylindrical sliding member 143 is detachably fitted in the through hole 141c of the dust collecting hood 141. Further, a plurality of cylindrical sliding members 143 having bores of different diameters are provided to accommodate a plurality of hammer bits 119 having the shanks 119b of different diameters. Thus, the cylindrical sliding members 143 can be replaced and mounted in the through hole 141c of the dust collecting hood 141 in order to accommodate the hammer bits 119 having the shanks 119b of different diameters.

Further, in this embodiment, the dust collecting hose 146 can be attached to and removed from the hose holder body 148 through the hose attachment/removal opening 148a, and the dust collecting hose 146 is locked against axial movement and held by engagement between the rib-like projections 148b of the hose holder body 148 and the valleys of the bellows-like part 146a of the dust collecting hose 146. With this construction, the front end position of the dust collecting hood 141 can be easily adjusted by changing the position of engagement of the bellows-like part 146a with respect to the projections 148a when attaching the dust collecting hose 146. Further, with the construction in which the dust collecting hose 146 is locked against axial movement by engagement between the rib-like projections 148a and the valleys of the bellows-like part 146a, the dust collecting hood 141 can be prevented from being displaced by vibration during chipping operation so that it can be reliably held in position.

Further, in this embodiment, the sleeve-like cylindrical sliding member 143 is provided on part of the dust collecting hood 141 and slidably fitted onto the shank 119b of the hammer bit 119, and the dust collecting hood 141 is directly guided by the shank 119b of the hammer bit 119. With this construction, the dust collecting hood 141 can be held with stability. Further, by provision of the holding stability, the dust collecting hood 141 can be placed closer to an area of dust generation, so that the dust collecting efficiency can be improved.

Second Embodiment of the Invention

Figure 7:
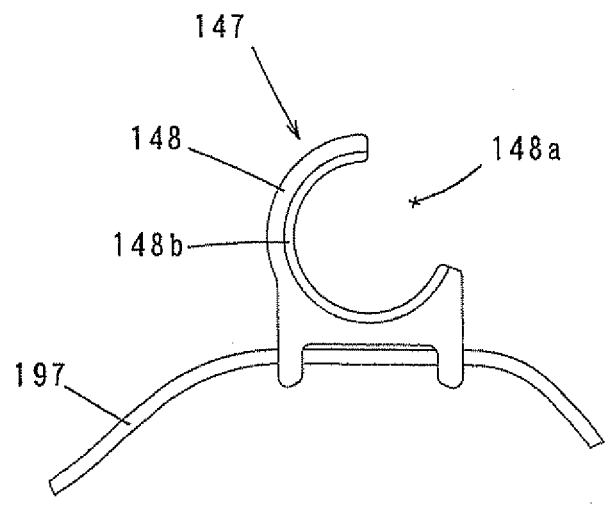
FIG. 7 is a front view showing a dust collecting device according to a second embodiment of the present invention, or particularly illustrating a structure of mounting a hose holder to the body of the electric hammer.
Figure 8:
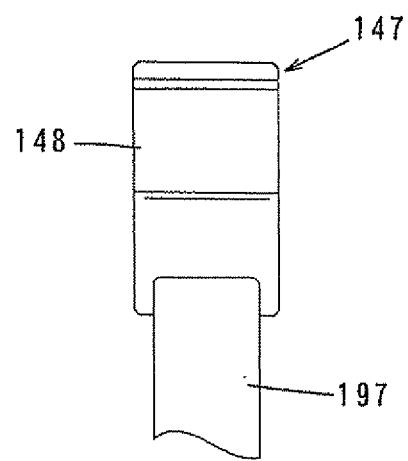
FIG. 8 is a side view thereof.
Figure 9:
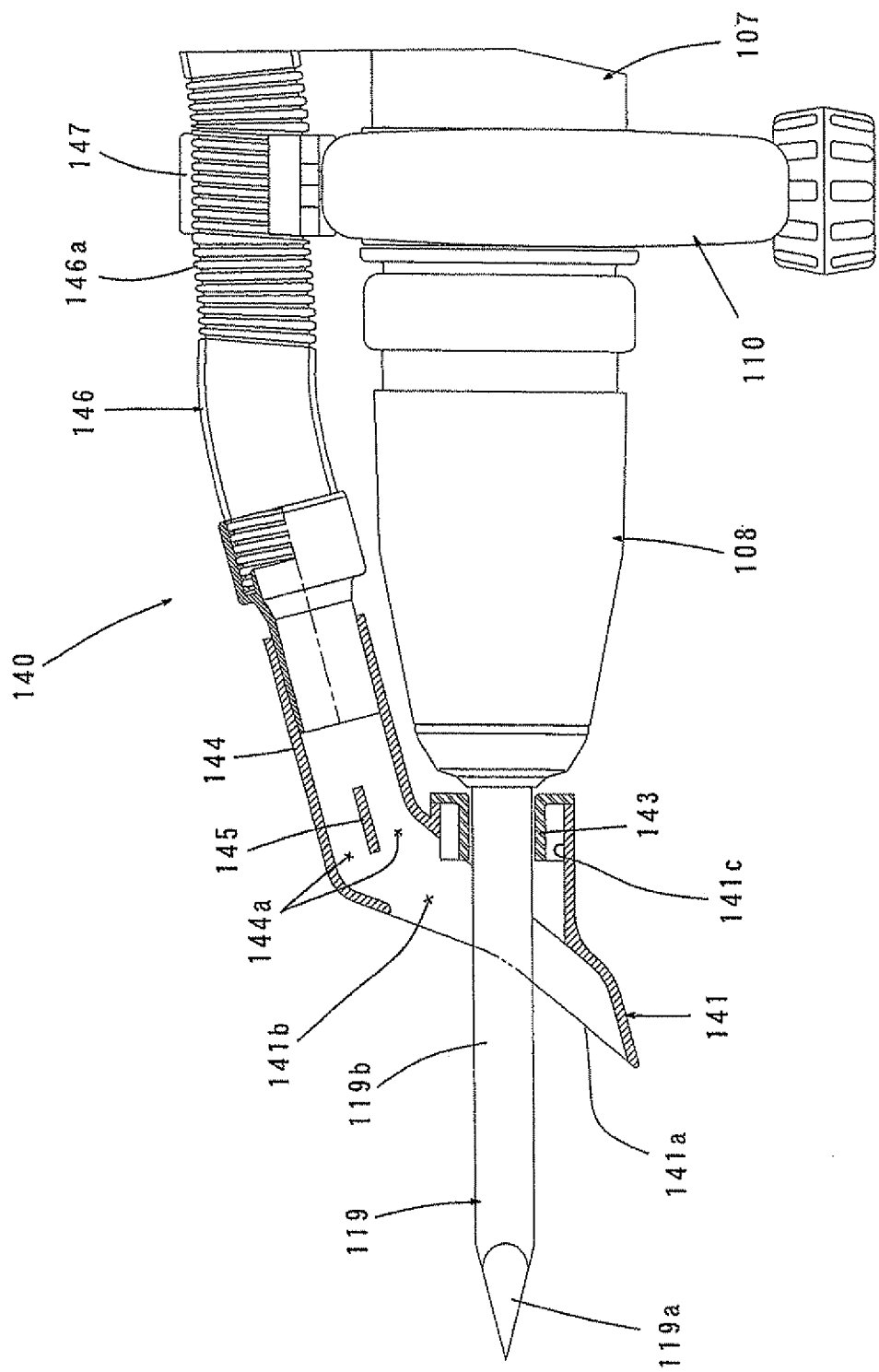
FIG. 9 is an external view showing a dust collecting device according to a third embodiment of the present invention, with a hose holder mounted to the body of the electric hammer via the side handle.

A second embodiment of the present invention relating to a structure of mounting the dust collecting device 140 to the electric hammer 101 is now described with reference to FIGS. 7 and 8. According to this embodiment, a flexible band-like member 197 such as a belt, a tape and a band is used to attach the dust collecting device 140 to the body 103 of the hammer 101 by wrapping around the body 103. The entire construction of the dust collecting device 140 is generally the same as in the above-described first embodiment, and only part of the dust collecting device 140 or the hose holder 147 is shown in FIGS. 7 and 8.

The hose holder 147 of the dust collecting device 140 according to this embodiment is constructed such that the band-like member 197 is passed through a wide hole formed in the base of the hose holder 148. Therefore, the hose holder 147 can be fixedly mounted to the body 103 by wrapping the band-like member 197 around the body 103, specifically around the axis of the barrel 107. As a result, the dust collecting hose 146 of the dust collecting device 140 can be held by the hose holder 147.

When the band-like member 197 is wrapped around the barrel 107, the hose holder 147 can be set at any position around the axis of the hammer bit 119. Therefore, like in the above-described first embodiment, the positions of the dust collecting hose 146 held by the hose holder 147 and the dust collecting hood 141 connected to the dust collecting hose 146 can be changed around the axis of the hammer bit 119, so that the dust collecting hose 146 can be moved to a position in which it can be avoided from interfering with the operation while securing visibility of the bit tip or a work area of the workpiece.

The band-like member 197 typically has a structure of fastening by a hook and loop fastener. The means for fastening the band-like member 197 however is not limited to the hook and loop fastener, but various other methods can be appropriately used. For example, the fastening methods include a method of fastening by inserting a pin through a belt hole, a method of buckling a belt by a fastener or a so-called buckle, and a method of fastening by looping a belt back through a rectangular ring and tightening the belt.

The band-like member 197 may be wrapped around the barrel 107 forward or rearward of the side handle 110, or it may be wrapped around the mounting region for the side handle 110 provided that the side handle 110 is removed.

The wrapping member is not limited to the band-like member 197, but it may be a flexible string-like member such as a rope and a chain (e.g. a ball chain formed by coupling a number of balls). Further, the wrapping member may be formed by a pair of semicircular plates which are rotatably connected at one end with respect to each other, or it may be formed by an elastically deformable ring member having a cut in part in the circumferential direction.

Third Embodiment of the Invention

A third embodiment of the present invention relating to a structure of mounting the dust collecting device 140 to the electric hammer 101 is now described with reference to FIGS. 9 to 12. According to the third embodiment, the dust collecting device 140 is attached to the body 103 of the hammer 101 via the side handle 110 and is not provided with the mounted ring 199 which is described in the first embodiment. Specifically, the hose holder 147 is mounted to the side handle 110, and the dust collecting hood 141 and the dust collecting hose 146 of the dust collecting device 140 have the same construction as in the first embodiment. Therefore, the dust collecting hood 141 and the dust collecting hose 146 are given like numerals as in the first embodiment and are not described or briefly described.

Figure 10:
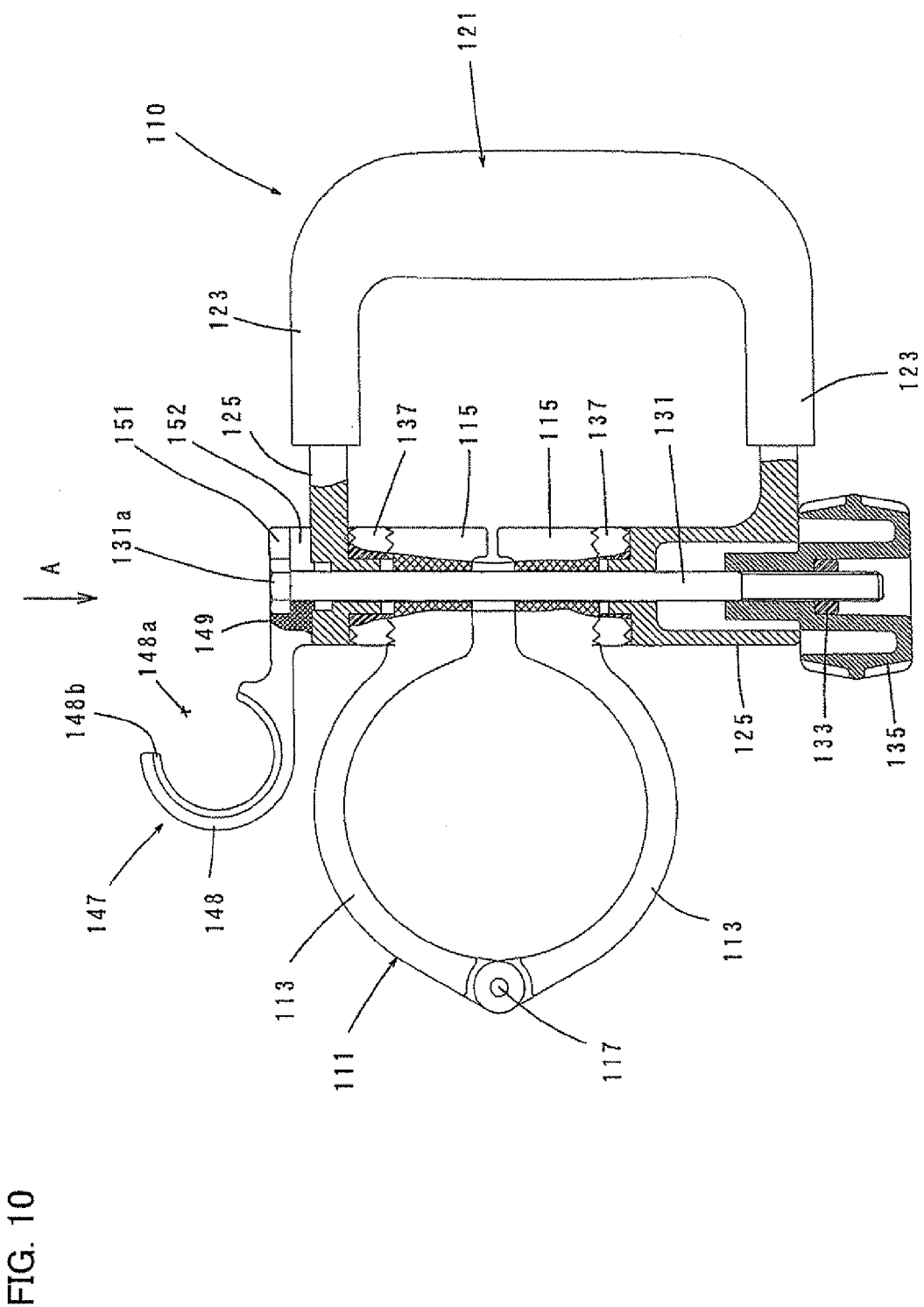
FIG. 10 is a partially sectional view showing a structure of mounting the hose holder to the side handle.

The side handle 110 to which the dust collecting device 140 is attached is explained mainly with reference to FIG. 10. The side handle 110 is detachably mounted onto the barrel 107 of the hammer 101. The side handle 110 mainly includes a mounting ring 111 which is mounted onto the generally cylindrical barrel 107 by holding the outer circumferential surface of the barrel 107 from the outside, a grip 121 connected to the mounting ring 111 and designed to be held by a user, and a fastening means which includes a through bolt 131 and a fastening knob 135 with a nut 133 and serves to clamp and loosen the mounting ring 111.

The mounting ring 111 includes a pair of upper and lower generally semicircular arc ring components 113. The pair ring components 113 are rotatably connected at one end with respect to each other via a shaft 117 which extends parallel to the longitudinal direction of the barrel 107. An outwardly protruding base 115 is formed on the other free end of each of the ring components 113.

The grip 121 has a rod-like shape having a generally circular section and has upper and lower arms 123 which extend in parallel to each other in a direction transverse to the longitudinal direction of the grip 121, from the both ends of the grip 121 in the longitudinal direction (the vertical direction as viewed in FIG. 10) toward the mounting ring 111. The bases 115 of the mounting ring 111 are disposed between extending end portions 125 of the upper and lower arms 123 via ring-like cams 137. The through bolt 131 is loosely inserted in the vertical direction through holes formed in the extending end portions 125, the cams 137 and the bases 115. The through bolt 131 has a hexagonal head 131a on one end, and the head 131a engages with an upper surface (bottom of a counterbore) of the extending end portion 125 of the upper arm 123 when the dust collecting device 140 is not attached. The other end of the through bolt 131 protrudes a predetermined distance from the extending end portion 125 of the lower arm 123. The nut 133 of the fastening knob 135 is threadingly engaged with a threaded portion of the through bolt 131.

In the side handle 110 constructed as described above, when the mounting ring 111 is loosely fitted onto the barrel 107 and the fastening knob 135 is turned in one direction (tightening direction), the upper and lower extending end portions 125 are clamped (pressed) and moved (deformed), due to elasticity of the arms 123, in a direction that lessens a distance therebetween (toward each other) by using the through bolt 131 and the fastening knob 135 (the nut 133). As a result, the bases 115 are also moved toward each other via the upper and lower cams 137 in a direction that lessens the ring diameter of the ring components 113. Thus, the mounting ring 111 is clamped onto the barrel 107.

When the fastening knob 135 is turned in the other direction (loosening direction), the upper and lower extending end portions 125 and the bases 115 clamped by the through bolt 131 and the fastening knob 135 are unclamped and return to their initial unclamped position, so that the mounting ring 111 is unclamped from the barrel 107. In this state, the position of the grip 121 can be changed around the axis of the barrel 107 by turning the side handle 110 around the axis of the barrel 107.

A structure of mounting the dust collecting device 140 to the side handle 110 constructed as described above is now described. In this embodiment, the mounting base 149 of the hose holder 147 is inserted between a head 131a of the through bolt 131 and the upper arm 123 of the grip 121 in the side handle 110 and fastened to the side handle 110, so that the dust collecting device 140 is attached to the side handle 110. For this purpose, the mounting base 149 is configured as a plate-like member extending straight from the hose holder body 148. The mounting base 149 has a notch 151 and a recessed engagement part 152. The notch 151 is generally U-shaped in planner view and can be fitted onto the through bolt 131 from a radial direction. The recessed engagement part 152 is formed along a peripheral edge of an upper surface of the notch 151 and serves to lock the head 131a of the through bolt 131 fitted in the notch 151 against rotation by engaging with the head 131a. Therefore, when the through bolt 131 is loosened, the hose holder 147 can be turned about 360 degrees around the through bolt 131, so that its position can be adjusted around the bolt axis. When the hose holder 147 is set in a predetermined position around the axis of the through bolt 131, the through bolt 131 is tightened by turning the fastening knob 135, the through bolt 131 which is engaged with the recessed engagement part 152 at the head 131a and locked against rotation is moved toward the fastening knob 135. In this manner, the mounting base 149 is fastened to the side handle 110 between the head 131a of the through bolt 131 and the upper arm 123.

According to this embodiment, when the mounting ring 111 is unclamped by loosening the fastening knob 135, the position of the grip 121 around the axis of the barrel 107 can be changed by turning the side handle 110 around the axis of the barrel 107. Therefore, when the position of the grip 121 is changed around the axis of the barrel 107, the position of the hose holder 147 of the dust collecting device 140 is changed together with the side handle 110. Specifically, the positions of the dust collecting hose 146 and the dust collecting hood 141 are changed around the axis of the hammer bit together with the side handle 110. Therefore, the positions of the dust collecting hose 146 and the dust collecting hood 141 can be changed at the same time as the position change of the side handle 110. Thus, an efficient and rational position changing operation can be realized.

Figure 11:
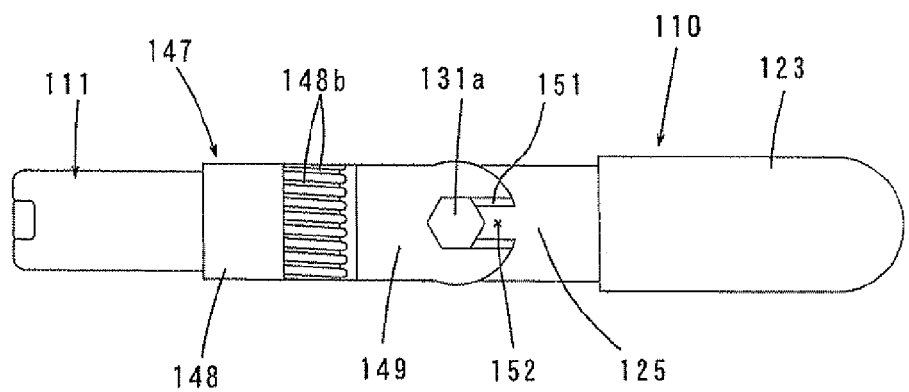
FIG. 11 is a view in the direction of arrow A in FIG. 10.
Figure 12:
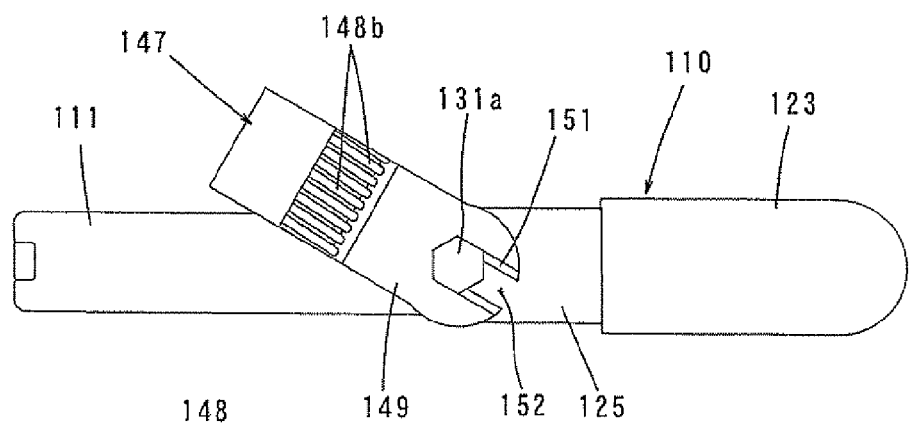
FIG. 12 is a view in the direction of arrow A in FIG. 10 and showing the hose holder changed in orientation.

In this embodiment, by provision of the structure of mounting the dust collecting device 140 to the side handle 110, in which the mounting base 149 of the hose holder 147 is inserted between the head 131a of the through bolt 131 and the upper arm 123 of the grip 121 in the side handle 110 and fastened to the side handle 110, the dust collecting device 140 can be attached to the side handle 110 without changing the structure of the side handle 110. Further, when the through bolt 131 is loosened, the orientation of the hose holder 147 can be changed by turning the hose holder 147 around the axis of the through bolt 131 together with the through bolt 131. Thus, as shown in FIGS. 11 and 12, like in the first embodiment, the direction of the dust collecting hose 146 can be changed by changing the direction of the central axis of the hose holder body 148 of the hose holder 147.

Further, in the above-described embodiments, the electric hammer in which the hammer bit 119 performs only hammering movement in the axial direction is explained as a representative example of the impact tool according to the present invention, but the present invention can also be applied to a hammer drill which can switch between hammering mode in which the hammer bit 119 performs hammering movement and hammer drill mode in which it performs hammering movement in the axial direction and hammer drill movement in the circumferential direction.

In view of the scope and spirit of the above-described invention, the following features can be provided.

(1)

"A dust collecting device that is attached to an impact tool and collects dust generated by the impact tool in which a tool bit coupled to a front end region of a tool body is caused to rectilinearly move in an axial direction of the tool bit, comprising:

a dust collecting part having a dust suction port at its front end and having a non-uniform shape around an axis of the tool bit, wherein:

a position of the dust collecting part can be arbitrarily selected around an axis of the tool bit and changed to the selected position around the axis of the tool bit, whereby the dust collecting part can be positioned in a user's line of sight such that a readily visible region of the dust collecting part is located in the line of sight when a bit tip or a work area of a workpiece is viewed over the dust collecting part."

DESCRIPTION OF NUMERALS 101 electric hammer (impact tool)
103 body
105 housing
107 barrel
108 chuck
109 handgrip (main handle)
110 side handle
111 mounting ring
113 ring component
115 base
117 shaft
119 hammer bit (tool bit)
119a bit tip
119b shank
121 grip
123 arm
125 extending end portion
131 through bolt
131a head
133 nut
135 fastening knob
137 cam
140 dust collecting device
141 dust collecting hood (dust collecting part)
141a dust suction port
141b internal space
141c through hole
143 cylindrical sliding member
144 hose connecting part
144a passage
145 partition
146 dust collecting hose (dust transfer part)
146a bellows-like part
147 hose holder (hose holding part)

148 hose holder body
148a hose attachment/removal opening
148b projection
149 mounting base
149a spherical recessed surface
151 notch
152 recessed engagement part
197 band-like member
198 O-ring
199 mounting ring (rotating member)
199a spherical portion

The invention claimed is:

1. A dust collecting device that is attached to an impact tool and collects dust generated by the impact tool in which a tool bit coupled to a front end region of a tool body is caused to rectilinearly move in an axial direction of the tool bit, the dust collecting device comprising:
  a dust collecting part having a dust suction port at a front end of the dust collecting device, the dust suction port having a non-uniform contour shape around an axis of the tool bit; and
  a dust collecting hose which is connected to the dust collecting part and through which dust is transferred downstream, wherein an external frontmost end of the dust collecting part defines an opening and is inclined such that the frontmost end extends toward a rear of the tool bit on one side thereof having a connecting part connected with the dust collecting hose, while extending toward a front of the tool bit on an opposite side from the connecting part side with respect to the tool bit.

2. The dust collecting device as defined in claim 1, wherein the dust collecting part is mounted onto the tool bit and can be changed in position around the axis of the tool bit.

3. The dust collecting device as defined in claim 1, further comprising:
  a hose holding part for holding the dust collecting hose,
  wherein the hose holding part is mounted on the tool body and can be rotated around the axis of the tool bit with respect to the tool body, and a position of the dust collecting part is changed around the axis of the tool bit when the dust collecting hose held by the hose holding part is rotated around the axis of the tool bit together with the hose holding part.

4. The dust collecting device as defined in claim 3, comprising a rotating member that is mounted onto the tool body and can be rotated around the axis of the tool bit with respect to the tool body, wherein the hose holding part is mounted to the rotating member and can be rotated around an axis transverse to an axial direction of the tool bit with respect to the rotating member.

5. The dust collecting device as defined in claim 1, further comprising:
  a hose holding part for holding the dust collecting hose,
  wherein the hose holding part is mounted to an auxiliary handle which is mounted on the tool body at a mounting position which can be changed around the axis of the tool bit, and when the mounting position of the auxiliary handle is changed with respect to the tool body, positions of the dust collecting hose held by the hose holding part and the dust collecting part are changed around the axis of the tool bit together with the auxiliary handle.

6. The dust collecting device as defined in claim 1, wherein a passage from the dust suction port to the dust collecting hose is partitioned into several parts by a partition, and a flow passage sectional area of each part of the partitioned passage is smaller than other flow passage sectional areas of the dust collecting hose.

7. An impact tool comprising:
  a tool body; and
  a dust collecting device that collects dust generated in which a tool bit coupled to a front end region of the tool body is caused to rectilinearly move in an axial direction of the tool bit, the dust collecting device includes:
    a dust collecting part having a dust suction port at a front end of the dust collecting device, the dust suction port having a non-uniform contour shape around an axis of the tool bit; and
    a dust collecting hose which is connected to the dust collecting part and through which dust is transferred downstream, wherein an external frontmost end of the dust collecting part defines an opening and is inclined such that the frontmost end extends toward a rear of the tool bit on one side thereof having a connecting part connected with the dust collecting hose, while extending toward a front of the tool bit on an opposite side from the connecting part side with respect to the tool bit.

* * * * *